United States Patent [19]

Stanley

[11] 3,965,761

[45] June 29, 1976

[54] LINEAR ACTUATOR

[76] Inventor: Richard B. Stanley, 4 Coventry on Duxbury, Rolling Meadows, Ill. 60008

[22] Filed: Mar. 21, 1974

[21] Appl. No.: 453,326

[52] U.S. Cl................................. 74/89.15; 74/459
[51] Int. Cl.²............................................... F16H 27/02
[58] Field of Search............... 74/89.15, 459, 424.8

[56] References Cited
UNITED STATES PATENTS

| | | | |
|---|---|---|---|
| 2,831,363 | 4/1958 | Lohr | 74/459 |
| 3,595,094 | 7/1971 | Lemor | 74/459 |
| 3,614,900 | 10/1971 | Wahlmark | 74/459 |

Primary Examiner—Samuel Scott
Assistant Examiner—Wesley S. Ratliff, Jr.
Attorney, Agent, or Firm—Mann, Brown & McWilliams

[57] ABSTRACT

A linear actuator of the threaded shaft actuator type comprising a rotary threaded shaft and a special bearing unit secured to the member to be moved linearly, in which the bearing unit comprises a plurality of rollers each having a plurality of radial right flanges intermediate their ends spaced apart and scheduled to complement the pitch of the shaft threading for rolling engagement herewith, which rollers at their ends are formed with bearing surfaces that are oblique relative to their axes that ride on spaced apart raceways defined by an outer race structure which in turn is secured to the member to be moved linearly. When shock loads are to be resisted, the bearing unit includes a nut threaded on the shaft and formed to receive the rollers without journaling same and be rotated by the rollers, and the bearing unit is resiliently mounted for cooperation with a stop fixed relative to the member (that is to be moved linearly) from which the nut is normally spaced, such that the nut normally serves no load bearing or transmitting functions, but when shock loads are occasioned, the nut engages the stop to transmit the shock loads thereto in bypassing relation to the rollers and the surfaces they cooperate with.

23 Claims, 12 Drawing Figures

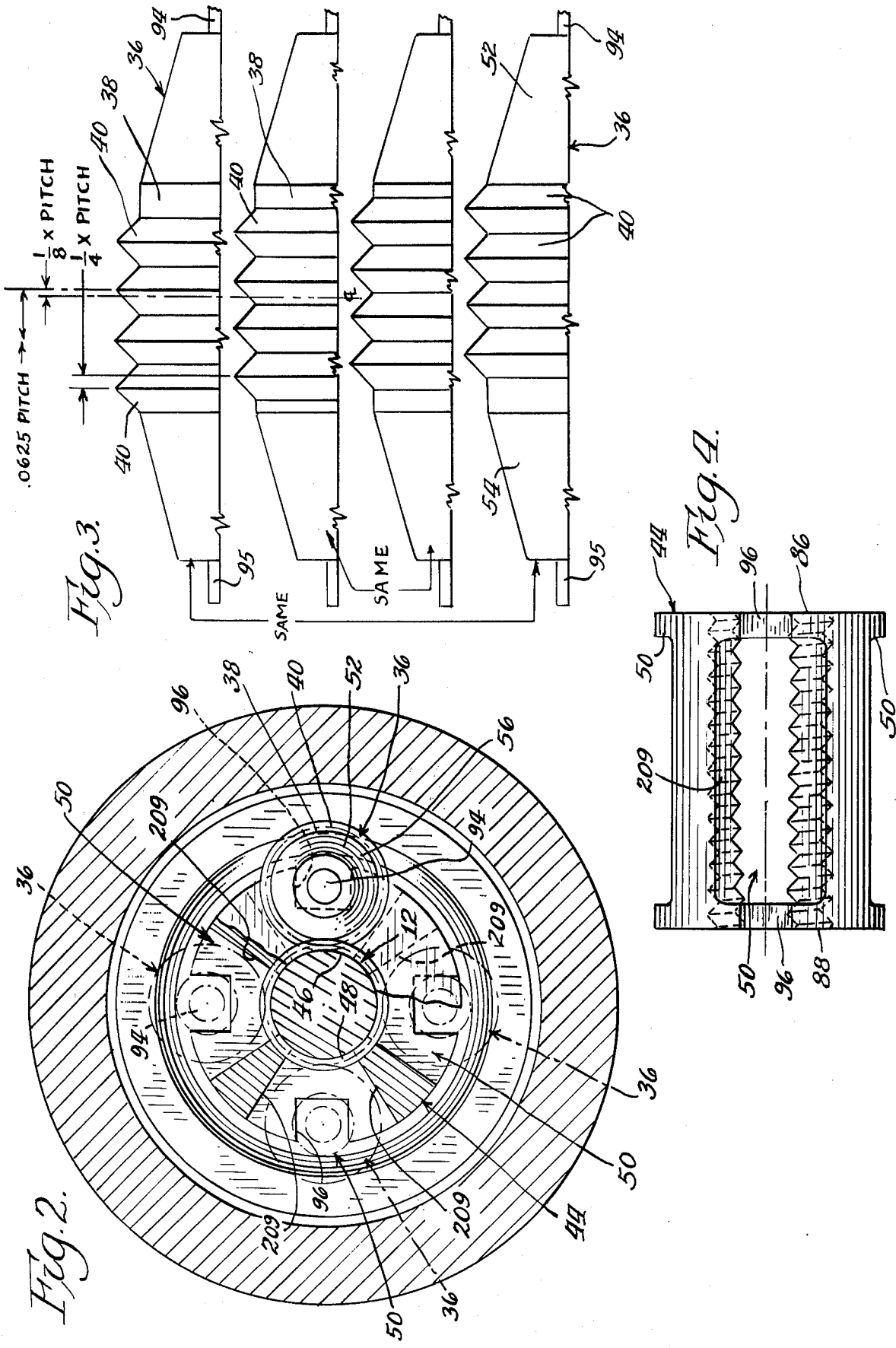

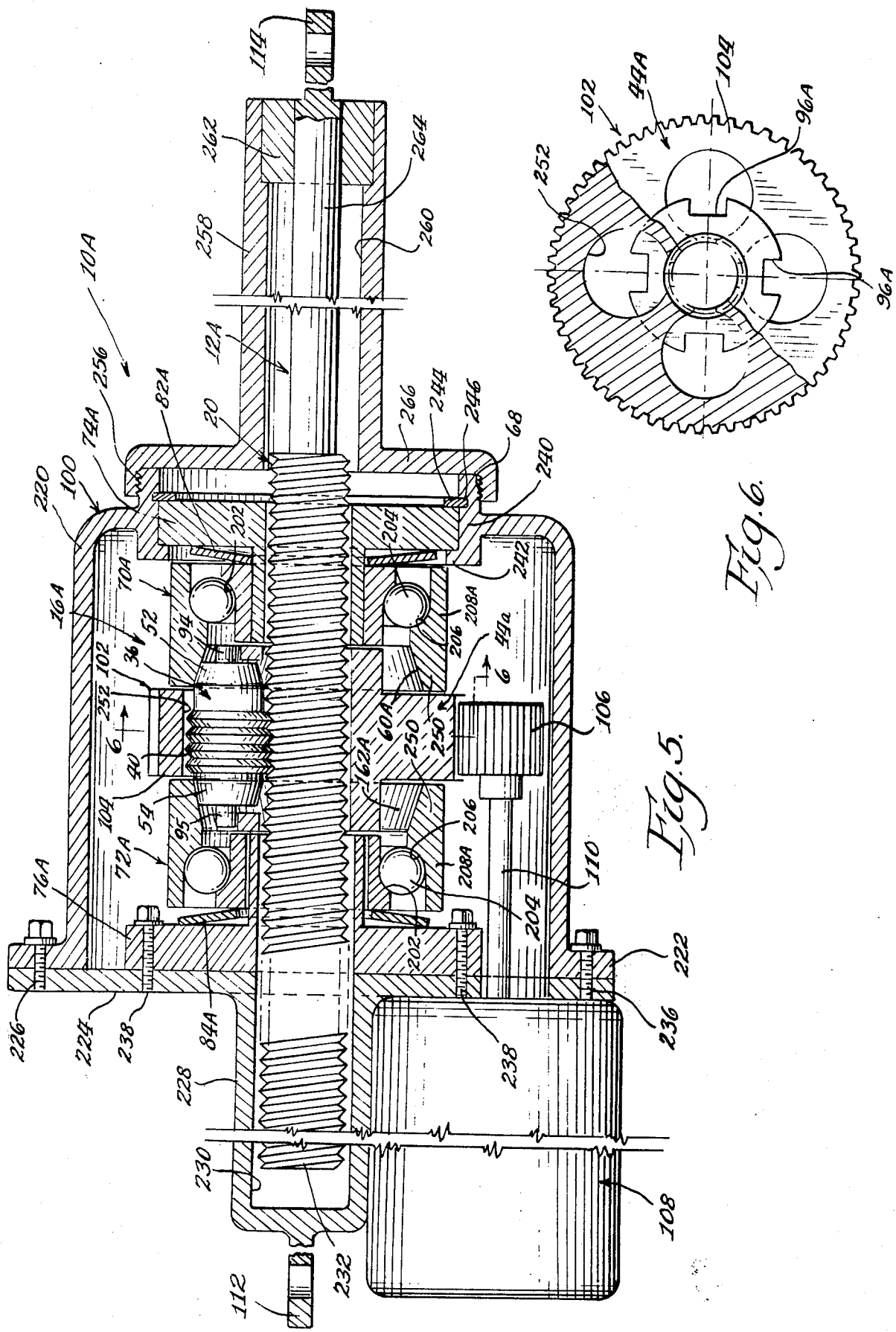

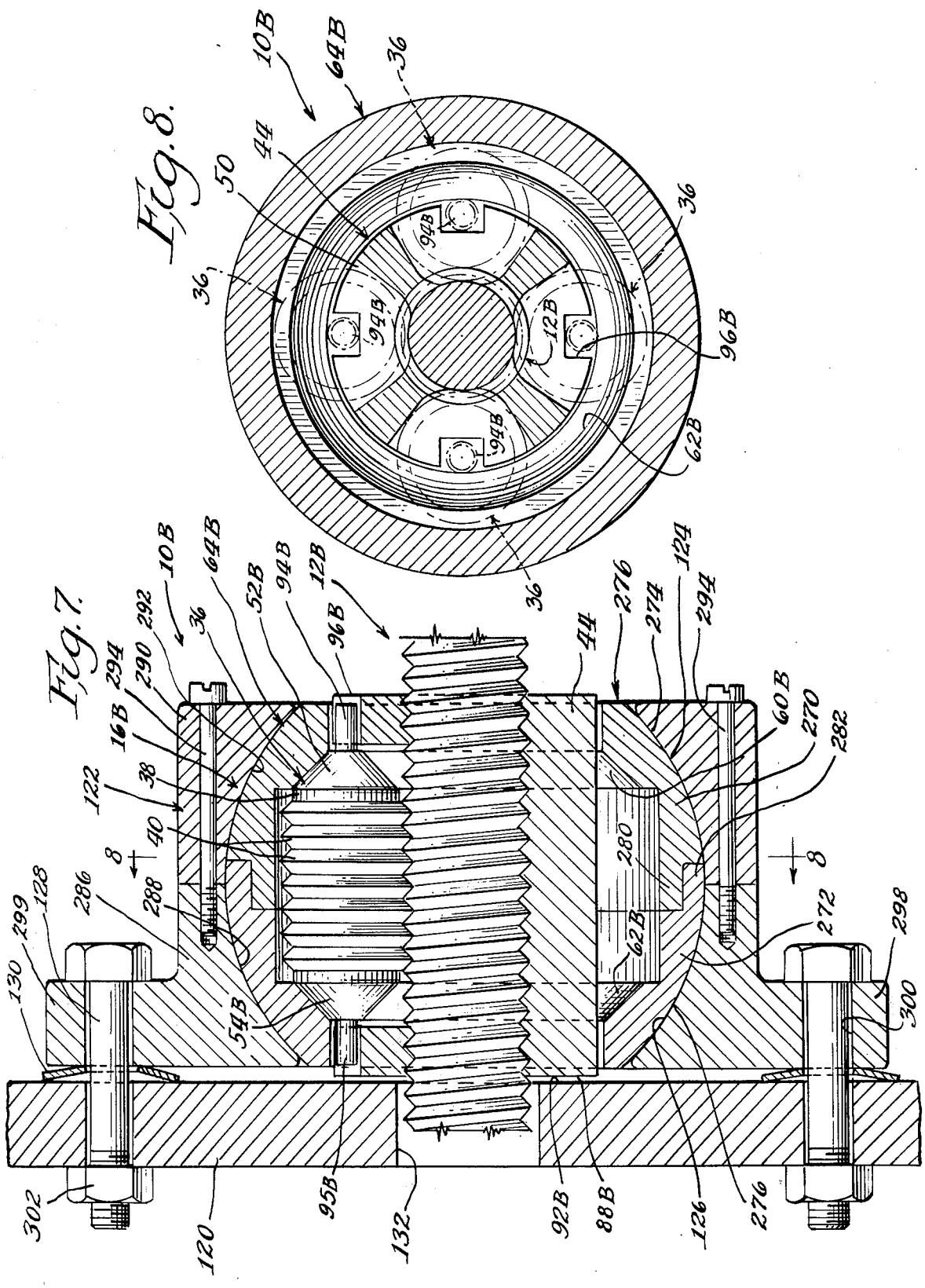

LINEAR ACTUATOR

This application is related to my copending application Ser. No. 344,198, filed Mar. 23, 1973, now U.S. Pat. No. 3,861,226, the filing date of which is claimed for all subject matter hereof that is common thereto.

My invention relates to, broadly speaking, a linear actuator, and more particularly, to a device for converting rotary motion to linear motion with high force conversion factors over any desired distance at low speed, and the present application deals with linear actuator arrangements of the general type described in my U.S. Pat. No. 3,861,226.

Existing mechanical devices presently in general use for converting rotary motion to linear motion fall into one of three basic groups, namely, screw and nut devices, which provide reasonable force conversion ratios at low efficiency, ball and nut devices, which provide high efficiency, but with low force conversion ratios, and rack and gear devices which provide low force conversion ratios at low efficiency. Prior to the applicant's inventions, there was no known mechanical method, insofar as the Applicant is aware, for converting rotary motion to linear motion with both high force conversion ratios and high efficiency.

Furthermore, while the common solenoid type device provides low force application at high speed for short distance using electrical energy, so far as the Applicant is aware, there is not in general use today any practical method of using electrical energy to provide high force at low speed over a comparatively long distance.

My said patent discloses a linear actuator of wide basic utility employing a shaft member, a tubular member telescopingly receiving the shaft member, and a special bearing unit interposed between the shaft and tubular member in which one of the members is threaded, and the bearing unit comprises a plurality of free rolling roller elements each formed with right radial flanges and flutes proportioned for meshing engagement with the threads of the threaded member and that ride on a raceway of the other member in resisting radial loads. The roller elements are free of any mounting or restraining bearings, have the orientation of their flanges scheduled in accordance with the pitch of the threading, and have thrust loads applied to their shanks so that all the rollers take thrust loads to an extent not heretofore thought possible.

Either the shaft member or the tubular member can be the threaded member, and either member can be the driving member (to move the other linearly), preferably using a suitable conventional electrical motor. The drive is performed through the rolling friction of the bearing parts involved, which is generated by the resistance encountered, the arrangement being such that the greater the load to be handled, the greater the friction there is available to handle it.

In one embodiment of the invention, it is the tubular member that is threaded, and the shaft that is driven, and as an example of the possibilities involved, the threading of the tubular member may be pitched in accordance with any desired force conversion factors, such as, for instance, 300 or 500 to 1, and the tubular member can be of such length, as may be necessary or desirable, to provide linear movement of the tubular member at high force over the desired distance. As only rolling friction is involved in the motion converting bearing unit and its relation to the driving shaft and driven tubular member, efficiency is on the order of 90 percent. The bearing unit involved is no larger than conventional ball bearing units for journaling shafts.

The present invention is concerned with improving and simplifying linear actuator arrangements of this general type.

A principal object of the invention is to provide a linear actuator arrangement that has high load carrying capacity, that operates at low speed over a desired distance, that is composed of few and simple parts adapted for inexpensive manufacturing operations, and that operates at efficiencies on the order of 90 percent.

Another principal object of the invention is to provide a motion translating bearing unit for use with threaded shafts to convert rotary motion to linear motion that is comparable in size and simplicity to the ordinary conventional ball bearing units commonly employed for shaft journaling purposes, but which is arranged for ready mounting and securement to parts to be moved linearly on rotation of the threaded shaft.

Another important object of the invention is to provide a bearing unit of the motion translating type employing free rolling unjournaled flanged rollers of the type disclosed in my said patent, which is arranged to accommodate shock loads by bypassing the flanged rollers that normally are the load transmitting elements of the device.

Other objects of the invention are to provide a linear actuator bearing arrangement that provides the efficiency advantages of ball nut devices at a fraction of their cost, to provide a linear actuator arrangement that is internally self-aligning, and to provide a linear actuator arrangement that is economical of manufacture, convenient to install and use, and is susceptible of a wide variety of applications for general purpose use.

In accordance with this invention, a linear actuator arrangement of the rotatable threaded shaft type is provided which is concerned with a simplified bearing unit arranged for ready connection to the member to be moved linearly, as well as ready operable association with the shaft. The bearing unit comprises a plurality of rollers, ordinarily three to four in number, each having a plurality of right radial flanges spaced apart and scheduled to complement the pitch of the shaft threading for rolling interfitting engagement with the shaft threading. The rollers at their ends are formed with bearing surfaces that are oblique relative to their longitudinal axes, which bearing surfaces ride on spaced apart raceways of an outer race structure that is arranged for securement to the member to be moved linearly. Following the teachings of my said patent, the rollers are free rolling and are unjournaled at their ends, and no spacing device is required as their interfitting with the shaft threading together with the scheduling of their flanges along their shanks for that purpose, achieves that end. The bearing unit is provided with means for supporting the flanged rollers radially when the shaft is separated from the bearing unit, to facilitate reapplication of the shaft to the bearing unit.

When shock loads are to be occasioned for a particular embodiment, the roller support is in the form of a nut threaded on the shaft, the bearing unit is resiliently mounted, and the member to be moved linearly is provided with a stop that is fixed relative thereto, so that shock loads in being applied to the member through the shaft shift the bearing unit to bring the nut against the stop whereby the shock load is applied to the member through the nut and stop thereby bypassing the motion translating components of the bearing unit.

Other objects, uses and advantages will be obvious or become apparent from a consideration of the following detailed description and the application drawings in which like reference numerals indicate like parts throughout the several views.

In the drawings:

FIG. 2 is a diagrammatic transverse cross-sectional view taken substantially along line 2—2 of FIG. 1, but on an enlarged scale, and showing the rollers in phantom;

FIG. 3 is a composite plan view of the rollers illustrating the manner in which their flanges or ridges are scheduled longitudinally of their shanks, in accordance with a specific embodiment of the invention;

FIG. 4 is a plan view of the shock load transmitting nut of the embodiment of FIGS. 1 - 3;

FIG. 5 is a view similar to that of FIG. 1, but illustrating another embodiment of the invention;

FIG. 6 is a partially sectional view of the load transmitting nut of the apparatus shown in FIG. 5, with the sectioning of the nut structure being substantially along line 6—6 of FIG. 5;

FIG. 7 is a sectional view illustrating an embodiment of the invention operably associated with a flange type bearing housing which in turn is applied to the member to be moved linearly;

FIG. 8 is a sectional view taken substantially along line 8—8 of FIG. 7;

However, it is to be understood that the specific drawing illustrations supplied are provided primarily to comply with the disclosure requirements of the Patent Laws, and that the invention is susceptible of modifications and variations which will be obvious to those skilled in the art, and which are intended to be covered by the appended claims.

GENERAL DESCRIPTION

Figure 1:
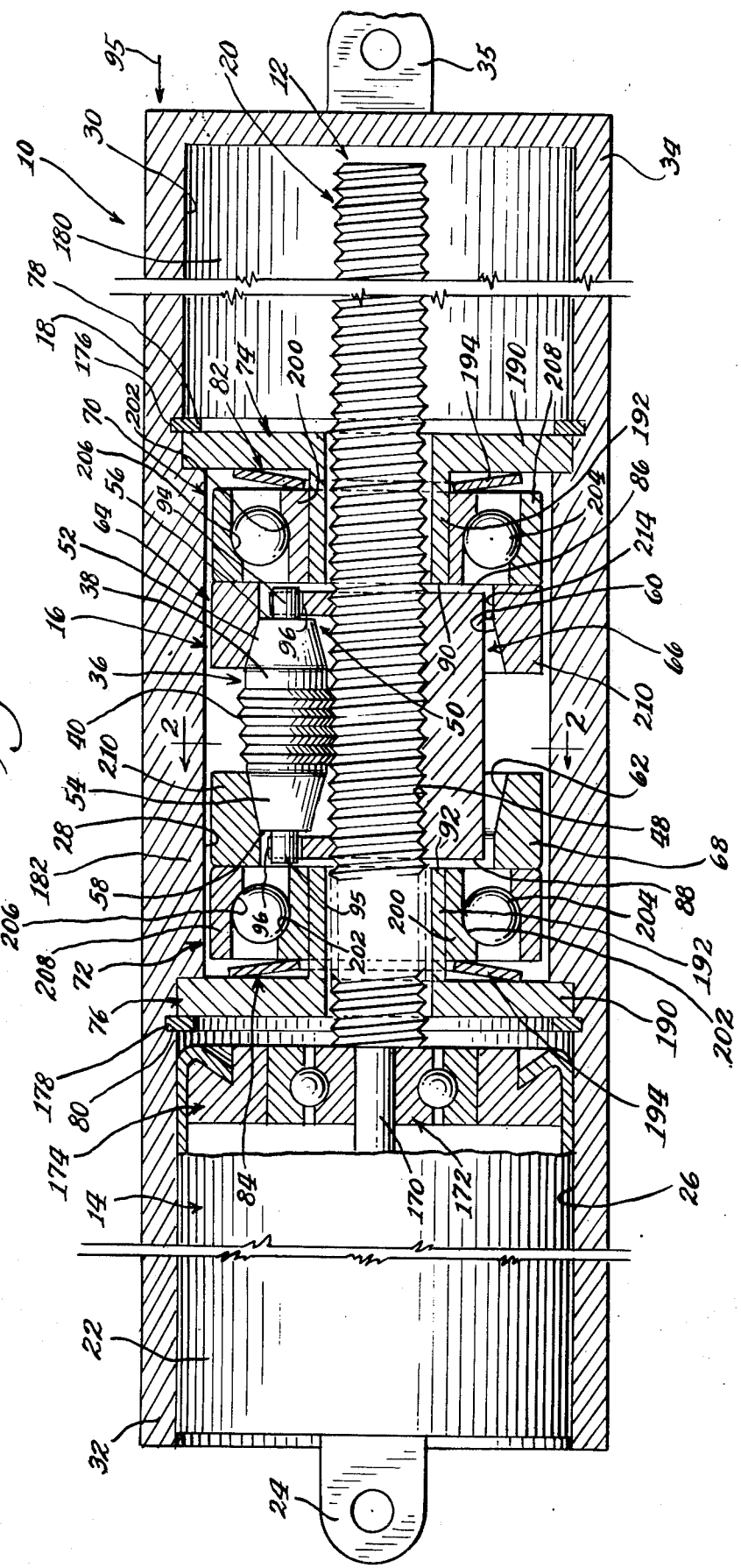
FIG. 1 is a longitudinal sectional view, partially in elevation, showing a specific linear actuator device arranged for commercial application and embodying the principles of the present invention.

Reference numeral 10 of FIGS. 1 and 2 generally indicates a linear actuator device arranged in accordance with the present invention, which comprises a threaded shaft 12 rotated by suitable electric motor 14, bearing unit 16 operably associated with the threaded shaft and arranged to convert rotary motion to linear motion, and a tubular member 18 to which the bearing unit 16 is secured for moving the tubular member 18 longitudinally of the axis of shaft 12 on operation of motor 14.

The shaft 12 is provided with external threading 20 which is preferably of the V type having 45° angulation.

Shaft 12 is suitably connected to the driving components of motor 14 (not shown) which driving components are housed in a suitable motor housing 22 that in the form illustrated includes suitable bracket 24 adapted for securement to one of the structures that the actuator 10 is to be secured between.

The tubular member 18 in the form shown defines a bore portion 26 that receives the motor 14, a bore portion 28 in which the bearing unit 16 is applied, and bore portion 30 into which shaft 12 extends in the contracted relation of the device. Tubular member 18 in the specific form shown has an open end 32 from which the motor 22 is exposed as the device is operated to move toward its extended relation, and the closed end 34 provided with suitable attachment bracket 35 is adapted for securement to the other component that the actuator 10 is to be secured to.

The bearing unit 16 generally comprises a plurality of rollers 36 (four in the embodiment of FIGS. 1 - 4) each having their shanks 38 formed to define a plurality of right radial flanges or ridges 40 having the same pitch as threading 20 and of 45° angulation for complementary interfitting therewith to be in rolling relation thereto. As indicated in FIG. 3, the ridges or flanges 400 are scheduled longitudinally of the shanks of the respective rollers in accordance with the circumferential location of the particular rollers in the bearing unit to accommodate the lead of the threading 20, following the teachings of my said patent.

The individual rollers 36 are received in a roller supporting nut 44 having its bore 46 internally threaded as at 48 for threaded engagement with the threading 20 of shaft 12. The nut is formed with an operating cavity or recess 50 for each roller 36, with the respective rollers 36 being received in the respective cavities 50 in the assembled relation of the bearing unit.

However, following the teachings of my said patent, the rollers 36 are not journaled in the nut 44, but rather are loosely received in the respective nut cavities 50 (see FIG. 2). The interfitting of the flanges 40 of the respective rollers with the shaft threading 20 effects the desired circumferential spacing of the rollers about the shaft, in accordance with the scheduling of flanges 40 of the respective rollers 36.

The rollers 36 are each formed with bearing surfaces 52 and 54 at their respective ends 56 and 58 which ride on the respective raceways 60 and 62 of the bearing unit outer race structure 64, which in the form of FIGS. 1 - 4 comprises a pair of ring members 66 and 68 assembled in spaced apart relation between ball bearing assemblies 70 and 72 that are of the thrust load transmitting type, which bearing units are shiftably mounted on the respective stop members 74 and 76 that are fixed to the tubular member 18 by the respective locking rings 78 and 80.

Interposed between the respective bearing units 70 and 72 and their respective stop members 74 and 76 are the respective biasing springs 82 and 84 which act to center the outer race structure 64 and rollers 36 between the stop members 74 and 76 and space the respective ends 86 and 88 of the nut 44 from the respective ends 90 and 92 of the respective stop members 74 and 76.

In the form shown, the rollers are provided with extensions 94 at either end of same which are disposed in slots 96 formed in the nut ends 86 and 88 to support the nuts 36 adjacent the outer race rings 66 and 68 when the shaft 12 is removed from the bearing unit. However, the roller extensions 94 and 95 serve no roller journaling purposes and in practice the extensions 94 and 95 are spaced from all the surfaces of the nut 44 which define the respective slots 96, when the shaft is operably applied to the bearing unit 16. Roller extensions 94 and 95 come into play, in cooperation with the nut slots 96, only when the shaft is removed from the bearing unit.

It will thus be seen that in the assembled relation of the linear actuator 10, the rollers 36 are in rolling relation with the threading 20 of the shaft 12, as well as in rolling relation with the respective raceway surfaces 60 and 62 of the outer race structure 64. Springs 82 and 84 maintain good tractional relationships of the rollers 36 with respect to both the shaft threading 20 and the outer raceways 60 and 62. The bearing surfaces 52 and 54 of the rollers and the raceway surfaces 60 and 62 are oblique relative to the longitudinal axes of the rollers and the shaft, and in a complemental self-centering manner.

On rotation of the shaft 12 by motor 14, the rollers 36 roll about the shaft 12 and the raceways 60 and 62. Assuming that the tubular member 18 is held against rotation relative to motor 14, as by application of the respective brackets 24 and 35 to the components they are to be connected to, whereby one component is to be moved linearly of the other, the bearing unit 16, and consequently the tubular member 18 to which it is secured, is moved to the right or to the left of FIG. 1, depending on direction of rotation of the shaft 12. Since the device 10 is shown in its fully contracted relation, it is assumed that the direction of rotation will be such that the tubular member 18 is moved to the right of FIG. 1 to extend the device, and rotation in the opposite direction will move the tubular member 18 to the left of FIG. 1 to contract same, assuming bracket 24 is secured to a stationary component and bracket 35 is secured to the component to be moved linearly.

As disclosed in my said patent, the pitch of the threading 20 may be made as desired to achieve the force conversion characteristics that are desired for a particular unit. As the pitch of the threading 20 defines the pitch and corresponding feed rate of device 10, and pitch is inversely proportional to the force conversion factors of the unit, in accordance with the applicable laws of mechanics, it will be seen that as zero pitch is approached, the force conversion factors approach infinity, making theoretically available large force output capabilities at slow speed where adequate purchase between the shaft 12 and the tubular member 18 can be achieved. In the embodiments of the present application, this purchase is achieved in the same manner as disclosed in my said patent. Thus, assuming that a load is acting on the tubular member in the direction indicated by the arrow 95 (see FIG. 1), and the motor 14 and the parts it is connected to are held against movement, the force acting in the direction of the arrow 95 is applied to the shaft 12 through the shear relation provided by the intermeshing parts of the bearing unit 16 and lock rings 78 and 80 therefor. As loads are increased, friction forces, through which the rotating shaft 12 acts on the rollers 36 (to resist the load), increase. This permits the transfer by the bearing unit to the tubular member the forces made possible by the force conversion factors involved in the particular pitch that is used in the shaft threading 20 (either to hold the tubular member 18 against movement or to move same linearly as desired on operation of the motor 14). Forces acting in the opposite direction provide a similar result.

Should shock loads be occasioned, either spring 82 or 84 deflects under load, depending on the direction of application of the shock load. Assuming that it is in the direction of the arrow 95, it is the spring 82 which yields, whereby the tubular member 18 moves to the left of the shaft 12 to bring the end 90 of the stop member 74 against end 86 of nut 44 whereby the shock load is transmitted to the shaft 12 through the stop member 74 and nut 44, to the exclusion of the rollers and outer raceways of the bearing unit 16. Shock loads acting in the opposite direction on the tubular member 18 act to contract the spring 84 in a similar manner whereby the end 92 of stop 76 is brought to bear against the end 88 of the nut 44.

Assuming that the shock loads are applied through the shaft member 12 to the tubular member, if the shock load acts in the direction of the arrow 95, it is the spring 84 which yields to bring the end 88 of the nut against the stop member 76, and shock loads acting in the opposite direction cause spring 82 to yield to bring the end 86 of the nut against the stop member 74 for transmittal of the shock loads to the tubular member.

As the device of FIGS. 1 - 4 has the shock load absorption capability indicated, whereby the motion translating bearing components are bypassed, the force conversion factors of the device 10 are limited by the yield strength of the respective springs 82 and 84 that are employed.

In the device 10A of FIGS. 5 and 6, it is the shaft 12A which is moved linearly, with the bearing unit 16A having its shock load absorbing nut 44A toothed as at 102 about its periphery 104 for meshing engagement with pinion 106 driven by motor 108 through shaft 110. Motor 108 is suitably secured to housing 100, the latter including a suitable bracket structure 112 for securement between one of the components between which the device 10A is applied and the shaft 12A having suitable bracket structure 114 for securement to the other of such components (which component is to be moved linearly).

With the shaft 12A held against rotation, and nut 44A rotated by motor 108, the shaft 12A will move linearly through the motion translating cooperation of the bearing unit rollers 36 with the shaft threading 20.

In the embodiment 10A, the linear movement of the shaft 12A is synchronized with the rotation of the motor 108 through the gear type coupling with the nut 44A that is provided by pinion 106 and gearing 102.

In the device 10B of FIGS. 7 and 8, the shaft 12B is assumed to be driven by a motor such as motor 14 for moving linearly a member 120 (to be moved linearly) to which bearing unit 16B is secured by employing flange type bearing housing 122.

In the particular device 10B that is illustrated, the outer race structure 64B has a spherically contoured periphery 124 for cooperation with a spherically contoured seat 126 defined by the bearing housing 122 for limited self-alignment of the shaft 12B relative to the member 120. The bearing housing 122 is secured to the member 120 employing suitable bolts 128, with springs 130 being interposed between the housing 122 and the member 120 for the purpose of spacing the end 88 of the nut 44 from the stop portion 92B that is defined by member 120 about opening 132 through which shaft 12B extends. The springs 130 yield on the application of shock forces to the shaft 12B, acting to the left of FIG. 7, to bring the nut end 88 against the stop area 92B of member 120 to transmit to the member 120 the shock forces involved, to the exclusion of the rollers 36 of the bearing unit 16B.

Figure 10:
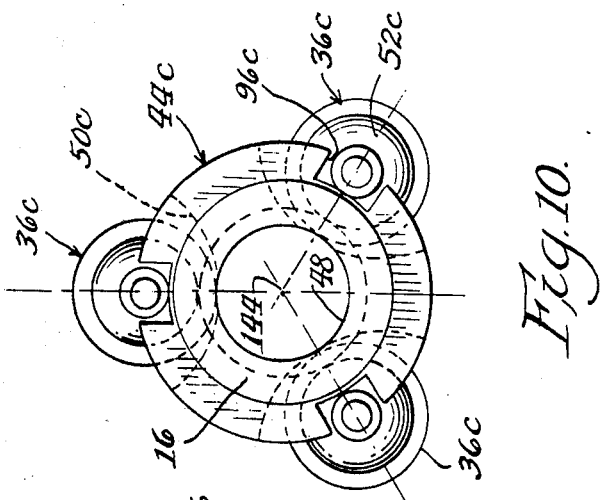
FIG. 10 is an end view of the shock load transmitting nut and associated rollers employed in the embodiment of FIG. 9.
Figure 9:
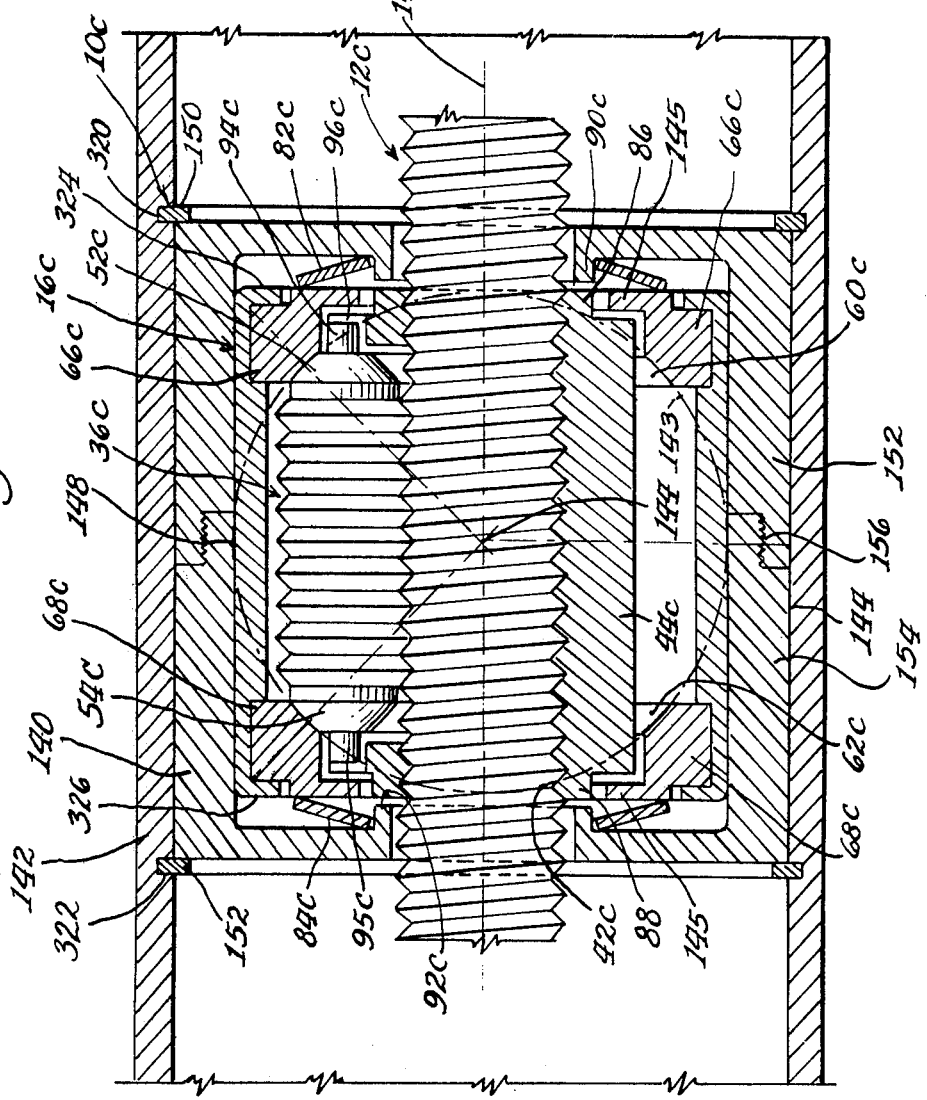
FIG. 9 is a sectional view illustrating another embodiment of the invention.

In the embodiment 10C of FIGS. 9 and 10, the bearing unit 16C is mounted within housing 140 that is in turn suitably secured to the member 142 to be moved linearly, similar to the general arrangement of FIGS. 1 – 4.

In the device 10C, the roller bearing surfaces 52 and 54, and the outer raceway surfaces 60 and 62 are spherically contoured in configuration, these surfaces being struck about an arc 143 having its center 144 lying on the longitudinal central axis 146 of the bearing unit 16C and shaft 12C, whereby the bearing parts are internally self-aligning to accommodate limited misalignment of the shaft 12C with regard to tubular member 142.

The outer raceway surfaces 60C and 62C are formed in race rings 66C and 68C respectively which are mounted in spaced relation in retainer sleeve 148 that is in turn shiftably received in housing 140, with springs 82C and 84C being interposed between the respective rings 66C and 68C and the housing 140 whereby the respective ends 86 and 88 of the nut 44C are spaced from the respective stop surfaces 90C and 92C of housing 140. Housing 140 in turn is keyed to tubular member 142 by suitable lock rings 150. Race rings 66C and 68C are flanged at 145 in overlying relation to the nut slots 96C.

Housing 140 in the form shown is composed of the half sections 152 and 154 suitably secured together, by employing threading where indicated at 156.

Figure 12:
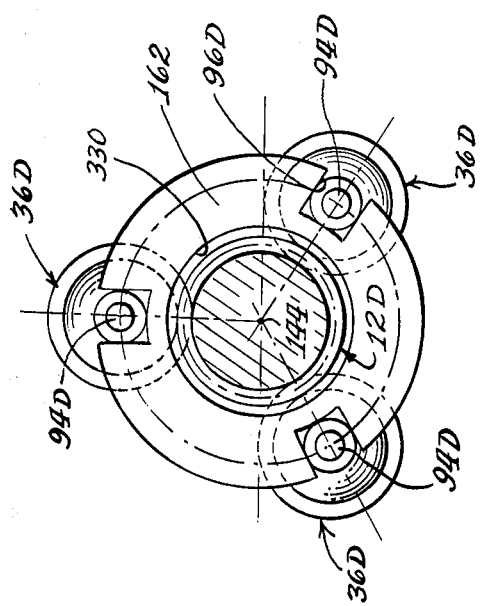
FIG. 12 is a sectional view similar to that of FIG. 10 but showing the flange rollers operably associated with simplified roller supports to hold the rollers adjacent the outer race raceways when the shaft is removed from the bearing unit.
Figure 11:
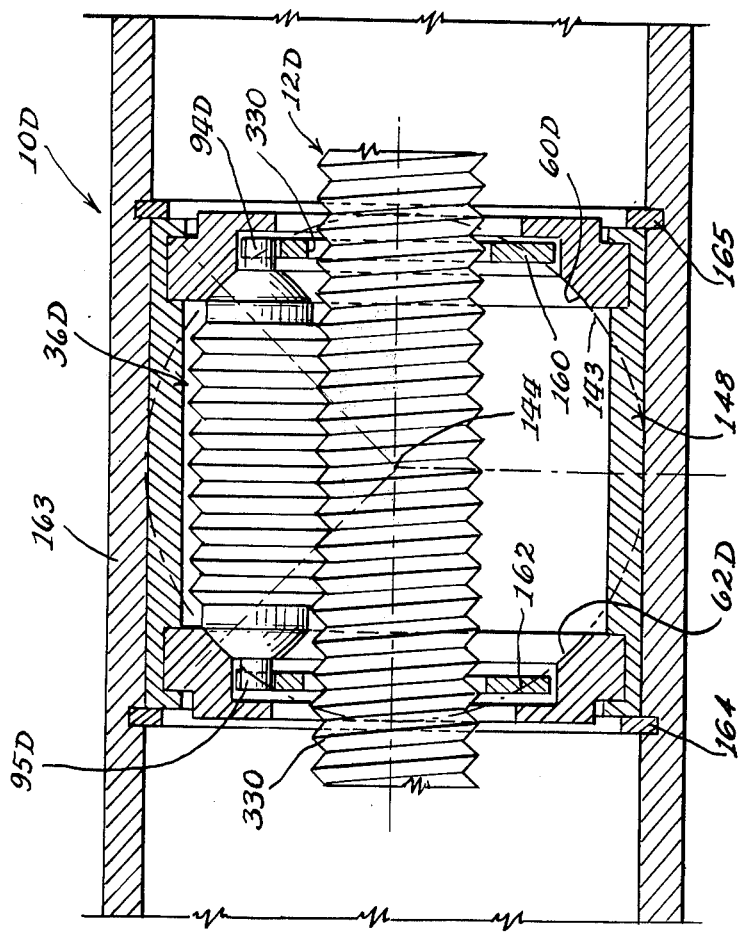
FIG. 11 is a sectional view illustrating a form of the invention that may be employed where no shock loads are to be encountered.

The embodiment 10D of FIGS. 11 and 12 is similar to that of FIGS. 9 and 10 except that in this embodiment of the invention it is assumed that no shock loads will be encountered and therefore the nut 44 is replaced by a pair of spaced apart roller support rings 160 and 162 that have the same function of supporting the rollers 36D adjacent the raceway surfaces 60D and 62D when the shaft 12D is removed from the bearing unit 16D. Also, the sleeve 148 is applied directly to tubular member 163, as by being keyed thereto, by suitable lock rings 164 and 165, with housing 140 being omitted.

The device 10D will transmit the maximum forces through same provided by the force conversion principles described in my said patent up to the yield point of the components involved, by reason of the non-yielding connection of bearing unit 16D to member 163.

SPECIFIC DESCRIPTION

In all embodiments of the invention the driving motor may be of any suitable reversibly drivable type. With reference to the embodiment of FIGS. 1 – 4, the specific nature of the components forming the motor housing 22 as well as those forming the motor itself may be of any suitable type, and generally speaking the specifics employed will depend on the application to which the invention is to be put. In the showing of FIG. 1, the driving shaft 12 is suitably keyed to motor shaft 170 which is journaled as at 172 and the motor housing end wall structure 174.

The tubular member 18 in the form shown in FIG. 1 is formed with annular recesses 176 and 178 in which the lock rings 78 and 80 are received.

The internal wall surface 180 is shown as being of stepped diameter configuration to provide an annular land 182 for the stop members 74 and 76 to abut against but in practice the internal surface 180 may be of uniform internal diameter and the land 182 defined by a sleeve received between the members 74 and 76, similar to the arrangement of FIGS. 9 and 10.

With regard to the bearing unit 16, the nut 44 is preferably formed from a suitable bearing steel or the like as are rollers 36 and outer race rings 66 and 68. These components, together with the shaft 12 are suitably hardened and ground to the shape indicated in accordance with standard practice for components of this type.

In the embodiments illustrated, the shaft threading is of the V type with 45° angulation and the roller flanges 40 are similarly contoured. The roller flanges or ridges 40, however, are not helically contoured, but are disposed transversely of the axis of the respective rollers, and thus are "right" in configuration.

As previously indicated, the ridges or flanges of the respective rollers 36 are located at different locations along the longitudinal axis of the respective rollers, depending on the circumferential location of a particular roller 36 in the bearing unit (see FIGS. 2 and 3) to accommodate the lead of the threading 12, following the disclosure of my said application.

As shown in FIG. 3, since four rollers are employed in the embodiment of FIGS. 1 – 4, two of the rollers 36 may have their ridges or flanges 36 located identically as indicated at the top and bottom of the figure, while the other two rollers may have their flanges or ridges 40 identically located as indicated. When applied to the bearing unit 16, as the upper and lower rollers of FIG. 3 are of the same shape, one of them is turned end for end, with regard to its position relative to the other roller in the bearing unit, in being applied thereto, as indicated by the showing of FIG. 3. Similar remarks apply to the two rollers 36 shown at the middle of FIG. 3. FIG. 3 indicates the consecutive positioning of the rollers 36 circumferentially about the shaft in accordance with the lead of the shaft threading 20.

The stop members 74 and 76 are of identical construction, each comprising a flange portion 190 that is keyed to the tubular member by the respective lock rings 78 and 80, and hub portion 192 which extends in the direction of the nut 44. The hub portions 192 define the respective stops 90 and 92 of the respective stop members 74 and 76.

The springs 82 and 84 may be of any suitable type, those shown comprising Belleville washer type springs 194 which cooperate between the respective stop member flanges 190 and the respective bearing units 70 and 72 to bias outer race ring 66 and 68 against the bearing surfaces 52 and 54 of the rollers 36. Wave washer type springs (not shown) may also be employed to form springs 82 and 84.

The bearing units 70 and 72 are identical in construction, each comprising inner race 200 having slip fit engagement with the respective hub members 192 of the respective stop members 74 and 76, and defining a raceway surface 202 for a plurality of bearing balls 204 that also ride on raceway surface 206 defined by outer race 208. The inner and outer raceway surfaces 202 and 206 are oriented and shaped for transmission of thrust loads in the manner indicated, with the outer races 208 being biased against the outer race rings 66 and 68, respectively by springs 82 and 84.

The outer race rings 66 and 68 are annular members 210 of identical construction, shaped to define the respective raceways 60 and 62 that are angled for complementary engagement with the respective roller bearing surfaces 52 and 54, and the internal surfaces 214 that are cylindrical in configuration and have internal diameters that are short of contact with the extensions 94 and 95 of the rollers 36.

It is to be noted that the race rings 66 and 68 and the outer races 208 are proportioned to be free of engagement with the tubular member 18 for free moving rotation with respect thereto on rotation of shaft 20.

As previously indicated, during operation of the device 10, that is, when the shaft 12 is rotated, the rollers 36 are rotated about the shaft 12 in unison, while at the same time rolling about the shaft about their respective axes. The tractional engagement of the rollers with the race rings 66 and 68, and the frictional engagement of the respective race rings 66 and 68 with the respective outer races 208 rotate these components in unison.

As long as the device 10 is not subjected to shock loads, the nut 44 merely idles, it being rotated abut the shaft 12 by the engagement of the roller flanges with the side walls 209 of the respective nut cavities 50. Since the nut 44 is under no load (assuming no shock load conditions), nut 44 subjects the rollers 36 to very little drag, with the result that because of the basic rolling friction type engagement that is involved in the operation of rollers 36, efficiencies are on the order of 90 percent.

However, when shock loads are occasioned, the springs 82 or 84 yield (the one that yields depends on the direction of application of the shock load) to bring the nut into engagement with one of the stop members 74 or 76, and specifically its hub portion 192 for providing a substantially solid structure for transmitting the shock load between the shaft and the tubular member or vice versa.

Referring to the embodiment of FIGS. 5 and 6, the housing 10 is largely diagrammatically illustrated, that shown comprising a casing 220 suitably proportioned to receive the bearing unit 16A and flanged as at 222 for application thereto of end plate 224 by employing suitable bolts 226. End plate 224 is formed with tubular extension 228 defining bore 230 which is adapted to receive the end 232 of shaft 12A; bracket 112 is also defined by the end plate 228. End plate 228 is also arranged to provide a mounting location for motor 108, which is suitably secured thereto by employing suitable bolts 236 and 238, the latter bolts also securing in place stop member 76A to which is applied bearing unit 72A and compression spring 84A in a manner comparable to the general arrangement of FIG. 1. On the other side of the nut 44A, the casing 200 defines an annular sleeve portion 240 having a shoulder 242 against which stop member 74A is applied by suitable lock ring 244 applied to recess 246 formed in the sleeve portion 240. Stop member 74A mounts bearing unit 70A and compression spring 82A in a manner comparable to the device of FIG. 1.

In the form of FIGS. 5 and 6, the outer race rings with which the respective rollers 36 cooperate are integrally united with the outer races 208A of the respective bearing units 70A and 72A.

The outer raceways 208A thus each define a projecting portion 250 on which the respective raceway surfaces 60A and 62A are formed. Bearing units 70A and 72A have bearing balls 204 riding on the respective raceways 202 and 206.

The nut 44A is formed to define circular openings 252 in which the respective rollers 36 are loosely received. The nut 44A also includes slots 96A in which the roller extensions 94 and 95 operate.

The casing sleeve portion 240 is externally threaded as at 256 for application thereto of housing extension member 258 defining a bore 260 through which the shaft 12A extends, which extension 258 suitably mounts a bearing 262 in which the rounded shank portion 264 of shaft 12A slidably moves. The housing extension 258 is formed with a bell shaped portion 266 that is internally threaded as at 268 for cooperation with a casing threading 256 for mounting the housing extension 258 on the case 220 in the manner indicated in the drawings.

As previously indicated, on operation of motor 108, nut 44A is rotated by pinion 106 to in turn rotate rollers 36 in orbit about shaft 12A. Since the bearing unit 16A of the device 10A is held against movement longitudinally of the shaft 12A, and the shaft 12A is mounted for movement of this type, it is the shaft 12A that is moved linearly by the operation of motor 108.

In the device of FIGS. 5 and 6, the nut 44A acts as a friction nut on the shaft to feed the shaft lengthwise thereof while the rollers 36 as a whole act as an antifriction nut handling the thrust forces transmitted through the device. As previously indicated, the gear drive coupling the motor to the nut and the threaded connection of the nut to the shaft synchronize the movement of the shaft with the rotation of the motor, which is useful in computerizing controls for linear movement of the shaft, for micropositioning applications.

In the device 10B of FIGS. 7 and 8, the shaft 12B is reversibly rotated in any suitable manner, as by employing a motor driven shaft arrangement of the general type shown in FIG. 1. Nut 44B and rollers 36B, and the surfaces they cooperate with are substantially the same as shown in FIG. 1, as indicated by corresponding reference numerals.

The outer race 64B comprises a pair of outer race rings 270 and 272 each spherically contoured as at 274 and 276, respectively, so that when placed together in the interfitting relation indicated in FIG. 7, they define an outer race shell 276 having the spherically contoured periphery 124. Rings 270 and 272 are respectively formed with interfitting flanges 280 and 282 for this purpose, with the respective rings 270 and 272 being formed to define the respective raceways surfaces 60B and 62B with which the roller bearing surfaces 52B and 54B respectively cooperate.

The rollers 36B have end extensions 94B and 95B which are disposed in the respective nut slots 96B in the same manner as indicated with regard to the embodiment of FIGS. 1 - 4.

The bearing housing structure 122 comprises a base member 286 formed with spherically contoured surface 288, and cap member 290 formed with spherically contoured surface 292, which surfaces 288 and 292 when the housing portions 286 and 290 are assembled define the spherically contoured bearing seat 126 in which the race rings 270 and 272 are swivelably mounted. Suitable bolts 294, or the like may be employed to secure the cap member 290 to the base 286.

The housing base 286 is formed in the manner of flange type bearing housings with a pair of spaced apart ears 298 and 299 formed with suitable bolt receiving openings 300 for application thereto of the respective bolts 128 that are secured to the member 120 by suitable nuts 302. Springs 130 may be in the form of conventional wave springs or Belleville washers.

In the form of FIGS. 7 and 8, the roller bearing surfaces 52B and 54B, and outer raceway surfaces 60B and 62B are at 45 degree angles for improved load transmitting characteristics.

In the embodiment 10C of FIGS. 9 and 10, the bearing unit housing 140 is fixed in place within the tubular member 142 by suitable lock rings 150 and 152 received in the respective recesses 320 and 322 formed in the tubular member 142.

In the bearing unit 16C, sleeve 148 has its ends 324 and 326 turned over the peripheries of the outer race rings 66C and 68C to hold the bearing components in assembled relation as a subassembly. As described in connection with the embodiments of FIGS. 1 - 4, the nut 44C is formed to hold the rollers 36C adjacent the spherically contoured raceway surfaces 60C and 62C when the shaft is separated from unit 16C. The roller bearing surfaces 52C and 54C of unit 16C are spherically contoured in a manner complementing the surfaces 60C and 62C, respectively, with the arcuate shaping involved being struck on an arc that has its center 144 on the longitudinal axis 146 of the shaft 12C, as already mentioned. Rollers 36C are received in cavities 50C of nut 44C, with the roller extensions 94C and 95C being received in the respective nut slots 96C.

The embodiment 10D of FIGS. 11 and 12 is a simplified form of the embodiment 10C in that roller support rings 160 and 162 take the place of the nut 44C. Rings 160 and 162 each are formed to define bores 330 that are free of threaded engagement with the shaft, and slots or notches 96D in which the extensions 94D and 95D of rollers 36D respectively operate in the manner already described.

The rings 160 and 162 are thus loosely received between the outer race ring flanges 145 and the respective roller ends 56D and 58D, and perform no load or motion transmitting function; their purpose is to support the rollers 36D adjacent the respective raceway surfaces 60D and 62D when the shaft 12D is separated from the bearing unit 16D.

It will therefore be seen that I have provided a motion translating bearing unit and linear actuator device in which the same may be assembled and operated at efficiencies on the order of 90 degrees, that is capable of high load carrying capacities, and provides a shock load resistance which bypasses the bearing rollers, and that is relatively inexpensive to manufacture. While the forms of the linear actuator equipped for shock load handling capacity will have reduced overall load carrying capacities, the shock loads that can be handled can be as high as 20 to 30 g's. There are many applications for linear actuators that do not require high force output but which do require good shock load handling capability. An example is powered automobile seats, wherein the mechanism for moving the seat forward and rearwardly of the automobile must be arranged to withstand high shock loads occurring when the car impacts an obstruction.

The linear actuators of this invention operate at efficiencies comparable to the ball screw type device but in addition provide for withstanding of shock loads and permit the bearing unit rollers and outer race rings to be sold as a separate subassembly, separate and distinct from the nut.

While the bearing units involved may be arranged to have any suitable number of rollers cooperating with the threaded shaft involved, for most applications a three roller unit will be adequate for load carrying capacity.

It is to be noted that in the operation of the device of this invention, the basic load stresses are through the antifriction rolling elements involved, with only shock forces being handled through the friction nut provided for this purpose.

The devices of this invention have wide applicability, in addition to use for automobile power seats, such as for automobile power windows, tailgates and automobile jacks, valve openers and circuit breakers, to mention just a few.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:
1. A linear actuator comprising:
 a threaded shaft member,
 a roller bearing assembly received about said shaft member and comprising a plurality of rollers having right flanges along their shanks rolling in threaded engagement with the shaft member threading, and an outer race structure defining spaced apart raceway surfaces, that are oblique relative to the longitudinal axis of said shaft, on which the ends of said rollers respectively ride,
 a support mounting said bearing assembly and having a portion of same received about the shaft member which the bearing assembly is secured,
 a nut member threaded on said shaft member and formed to freely receive said rollers in spaced apart relation about the shaft,
 stop means fixed relative to said bearing unit mounting support and disposed adjacent one end of said nut member,
 resilient means for resiliently spacing said nut member from said stop means,
 whereby shock loads acting longitudinally of the shaft member in the direction of said stop means effect a yielding of said resilient means to bring said nut member end into bearing relation to said stop means to transmit said shock forces thereto.
 one of said members being movable longitudinally of the shaft,
 and means for rotating the other member to linearly move said one member through said bearing assembly.

2. The improvement set forth in claim 1 wherein:
 said raceway surface and said ends of said rollers define spherically contoured complementing surfaces struck on an arc having its center on the longitudinal axis of the shaft member.

3. In a linear actuator including a threaded shaft member, a bearing unit mounting member having a portion disposed in substantial concentric relation to the shaft member, a bearing unit interposed between said shaft member and said mounting member for moving one of said members linearly relative to the other member, and means for rotating the shaft member, the improvement wherein said bearing unit comprises:
 an outer race structure received about said shaft member,
 and a plurality of discrete rollers received between said shaft member and said outer race structure in rolling relation about said shaft member and in rolling relation within said outer race structure,
said rollers each comprising elongate roller elements circumferentially spaced about and extending axially of the shaft member and each defining:
a bearing surface about either end of same that is oblique relative to the longitudinal axis of the respective rollers,
and a plurality of right flanges intermediate said bearing surfaces of the respective rollers and in rolling threaded engagement with the shaft member threading,
said outer race structure defining spaced annular raceways respectively radially aligned with the respective roller bearing surfaces on which the respective roller bearing surfaces ride in rolling engagement therewith, with said raceways being in substantial concentric relation about the shaft member,
said roller flanges being free of engagement with said outer race structure and the mounting member and said roller elements being in free rolling nonjournalled relation to said outer race structure,
and means for securing the bearing unit to the mounting member for linearly moving said one member on rotation of said shaft member.

4. The improvement set forth in claim 3 wherein:
the shaft threading is formed by 45 degree angle V threads,
with said roller flanges being formed to complement the shape of the shaft member threading.

5. The improvement set forth in claim 3 wherein:
said outer race structure comprises a pair of ring members,
with one of said ring members forming one of said raceways and the other of said ring members forming the other raceway.

6. The improvement set forth in claim 5 wherein:
said ring members are spaced apart longitudinally of the shaft member.

7. In a linear actuator including a threaded shaft member, a bearing unit mounting member having a portion disposed in substantial concentric relation to the shaft member, a bearing unit interposed between said shaft member and said mounting member for moving one of said members linearly relative to the other member, and means for rotating the shaft member, the improvement wherein said bearing unit comprises:
an outer race structure received about said shaft member,
and a plurality of rollers received between said shaft member and said outer race structure in rolling relation about said shaft member and in rolling relation within said outer race structure,
said rollers each defining:
a bearing surface at either end of same that is oblique relative to the longitudinal axis of the respective rollers,
and a plurality of right flanges intermediate said bearing surfaces of the respective rollers and in rolling threaded engagement with the shaft member threading,
said outer race structure defining spaced annular raceways inwardly disposed and oblique relative to the length of said shaft member and respectively radially aligned with the respective roller bearing surfaces on which the respective roller bearing surfaces ride,
said roller flanges being free of engagement with said outer race structure and the mounting member,
and means for securing the bearing unit to the mounting member for linearly moving said one member on rotation of said shaft member,
said outer race structure comprising a pair of ring members,
with one of said ring members forming one of said raceways and the other of said ring members forming the other raceway,
said securing means comprising:
a pair of annular members keyed to the mounting member and disposed in spaced apart relation on either side of said ring members about the shaft member adjacent opposed ends of said ring members,
and antifriction means interposed between the respective ring member ends and the annular member adjacent same.

8. The improvement set forth in claim 7 wherein:
said ring members are free of engagement with the mounting member,
and wherein said antifriction means include means for journaling said ring members for rotation relative to said annular members and means for transmitting thrust forces longitudinally of said shaft member.

9. The improvement set forth in claim 5 wherein:
the mounting member comprises a bearing unit housing,
said ring members being swivelly mounted in said housing for forming said securing means.

10. In a linear actuator including a threaded shaft member, a bearing unit mounting member having a portion disposed in substantial concentric relation to the shaft member, a bearing unit interposed between said shaft member and said mounting member for moving one of said members linearly relative to the other member, and means for rotating the shaft member, the improvement wherein said bearing unit comprises:
an outer race structure received about said shaft member,
and a plurality of rollers received between said shaft member and said outer race structure in rolling relation thereabout,
said rollers each defining:
a bearing surface at either end of same that is oblique relative to the longitudinal axis of the respective rollers,
and a plurality of right flanges intermediate said bearing surfaces of the respective rollers and in rolling threaded engagement with the shaft member threading,
said outer race structure defining spaced annular raceways respectively radially aligned with the respective roller bearing surfaces on which the respective roller bearing surfaces ride,
said roller flanges being free of engagement with said outer race structure and the mounting member,
and means for securing the bearing unit to the mounting member for linearly moving said one member on rotation of said shaft member,
said raceway surfaces and said roller bearing surfaces define spherically contoured complementing surfaces struck on an arc having its center on the longitudinal axis of the shaft.

11. The improvement set forth in claim 1 wherein:

the mounting member is the linearly movable member.

12. The improvement set forth in claim 1 wherein: the shaft member is the linearly movable member.

13. In a linear actuator including a threaded shaft, a member to be moved linearly by the shaft, a bearing unit operatively connected to said member and shaft for translating rotational movement of said shaft to linear movement of said member, and means for rotating the shaft, the improvement wherein said bearing unit comprises:

an outer race structure received about said shaft,
and a plurality of rollers received between said shaft and said outer race structure in rolling relation thereabout,
said rollers each defining:
a bearing surface at either end of same that is oblique relative to the longitudinal axis of the respective rollers,
and a plurality of right flanges intermediate said bearing surfaces of the respective rollers and in rolling threaded engagement with the shaft,
said outer race structure defining spaced annular raceways respectively radially aligned with the respective roller bearing surfaces on which the respective roller bearing surfaces ride,
said roller flanges being free of engagement with said outer race and the tubular member,
said improvement further including:
means for resiliently coupling the member to said race structure for movement therewith linearly of the shaft on rotation of the shaft,
a roller support threaded on said shaft and having said rollers disposed therein in free rolling relation relative thereto,
and a stop fixed with respect to the member and disposed adjacent but spaced from one end of said roller support,
said coupling means including resilient means acting on said race structure to resiliently bias said bearing unit to space said roller support one end from said stop,
whereby on rotation of said shaft, said rollers roll thereabout to move the member longitudinally of the shaft through said coupling means, and when shock loads acting longitudinally of the shaft in the direction to move said roller support toward said stop are occasioned, said resilient means yields to bring said end of said roller support to bear against the stop to resist the shock load.

14. The improvement set forth in claim 13 wherein: the shaft threading is formed by 45 degree angle V threads,
with said roller flanges being formed to complement the shape of the shaft threading.

15. The improvement set forth in claim 13 wherein: said outer race structure comprises a pair of ring elements,
with one of said ring elements forming one of said raceways and the other of said ring elements forming the other raceway.

16. The improvement set forth in claim 15 wherein: said ring elements are spaced apart longitudinally of the shaft.

17. The improvement set forth in claim 15 wherein: said coupling means comprises:
a pair of annular components keyed to the member and disposed in spaced about relation on either side of said ring elements, about the shaft adjacent opposed ends of same,
and antifriction means interposed between the respective ring element ends and the annular component adjacent same.

18. The improvement set forth in claim 15 wherein: the member comprises a bearing unit housing,
said ring elements being swivelly mounted in said housing for forming said coupling means.

19. The improvement set forth in claim 15 wherein: said ring elements are free of engagement with the tubular member,
said coupling means further comprising:
a pair of annular components fixed with respect to the member and disposed on either side of said ring elements and about the shaft,
and antifriction means interposed between the respective ring element ends and the annular component adjacent same,
whereby on rotation of the shaft, said ring elements rotate with respect to said annular components.

20. The improvement set forth in claim 3 including: means for journalling said outer race structure for rotation about said shaft member.

21. A motion translating bearing unit for application between a threaded shaft member and a member for mounting the bearing unit to move one of the members linearly of the other by the translation of rotary motion to linear motion through the bearing unit, sad bearing unit comprising:
a plurality of rollers having right flanges along their shanks spaced for rolling engagement with the shaft threading,
said rollers at their ends defining bearing surfaces that are oblique relative to their longitudinal axes,
an outer race structure defining spaced apart raceway surfaces about which said roller bearing surfaces respectively ride,
and a roller support about which said rollers are received in free rolling nonjournaled relation thereto,
said support being formed to be received over the shaft,
said rollers having projecting end portions and said support being formed for cooperation with said roller end portions to support the rollers against substantial radial displacement relative to said raceways when the bearing unit is free of the shaft.

22. The bearing unit set forth in claim 21 wherein: said support is threaded for threaded engagement with the shaft threading,
with the ends of the support serving as abutments for application of shock loads thereto.

23. The bearing unit set forth in claim 21 wherein: said support comprises a pair of spaced apart rings,
with said rollers and outer race structure being formed to loosely mount said rings in cooperative radial holding relation with the respective roller end portions.

* * * * *

UNITED STATES PATENT OFFICE
CERTIFICATE OF CORRECTION

Patent No. 3,965,761　　　　　　　　Dated　June 29, 1976

Inventor(s)　　　　RICHARD B. STANLEY

It is certified that error appears in the above-identified patent and that said Letters Patent are hereby corrected as shown below:

Column 4, line 25, "400" should read --40--:
Column 4, line 67, "nuts" should be --rollers--; Column 9, line 51, "200" should read --220--; Column 16, line 33, "sad" should read --said--.

Signed and Sealed this

Thirtieth Day of November 1976

[SEAL]

Attest:

RUTH C. MASON　　　　　　　　C. MARSHALL DANN
*Attesting Officer*　　　　　　*Commissioner of Patents and Trademarks*